United States Patent [19]

Mishina

[11] Patent Number: 5,740,060
[45] Date of Patent: Apr. 14, 1998

[54] STORAGE AND MATERIALS HANDLING FACILITY

[75] Inventor: Yasuhisa Mishina, Aichi-ken, Japan

[73] Assignee: Daifuku Co., Ltd., Osaka, Japan

[21] Appl. No.: 691,020

[22] Filed: Aug. 5, 1996

[30] Foreign Application Priority Data

Aug. 7, 1995 [JP] Japan ................... 7-200124
Sep. 13, 1995 [JP] Japan ................... 7-234536

[51] Int. Cl.$^6$ .............................................. G06F 19/00
[52] U.S. Cl. ............... 364/478.02; 364/138; 395/200.69; 340/827
[58] Field of Search .................. 364/478.02, 138, 364/139; 414/273; 395/200.14, 200.02, 200.5, 200.51, 200.69, 182.08, 182.09; 340/825.01, 827, 825.03, 825.06, 825.07

[56] References Cited

U.S. PATENT DOCUMENTS 4,760,488  7/1988  Kishimoto ................ 340/825.01
5,323,144  6/1994  Imai et al. ................ 340/825.01
5,536,128  7/1996  Shimoyashiro et al. ........ 364/468.28 X

FOREIGN PATENT DOCUMENTS 4280702   6/1992   Japan.
4327404  11/1992   Japan.

*Primary Examiner*—Joseph Ruggiero
*Attorney, Agent, or Firm*—Barnes, Kisselle, Raisch, Choate, Whittemore & Hulbert P.C

[57] ABSTRACT

A storing and materials handling facility comprises two communication cables 37, 38 laid between apparatus constituting the facility, integrated control units 31–35 for each of the apparatus are connected by way of branch interface to the two communication cables 37, 38, each of the integrated control units 31–35 transmitting the information data by way of the first communication cable 37 and transmitting the control data by way of the second communication cable 38, in which the branch interface is adapted such that if interference is detected in one of the communication cables, the information data and the communication control data are transmitted by way of the other of the communication cables.

3 Claims, 10 Drawing Sheets (RETRIEVAL OPERATION)

FIG.9 (STORING CONTROL)

STORAGE AND MATERIALS HANDLING FACILITY

FIELD OF THE INVENTION

The present invention concerns a storage and materials handling facility, for example, a facility comprising, in combination, automated warehouses; self-running conveyor vehicles for conveying loads and conveyor devices constituting peripheral load handling apparatus for them.

BACKGROUND OF THE INVENTION

Known storage and materials handling facilities comprise) for example, a plurality of automated warehouses, a plurality of self-running conveyor vehicles and a plurality of conveyor devices in combination, and control units disposed to each of the apparatuses constituting the facility are connected to one integrated control unit on every area of the facility or on every function of each of the apparatuses. Then, data are exchanged between the control unit and the integrated control unit by way of communication means disposed in each of the control units. Further, a local network (LAN) is formed with a plurality of integrated control units, and data collected on every area and every function are exchanged between each of the integrated control units. Further, a predetermined integrated control unit is connected to a control computer of the facility, and data are exchanged between each of the integrated control units and the control computer by way of the predetermined integrated control unit.

The integrated control units are controlled by the control computer by data exchange and the control unit for each of the apparatuses is controlled by each of the integrated control units, whereby the entire apparatuses are operated in association to conduct the storage and materials handling operation.

Further, the integrated control unit for integrating the control units of a plurality of automated warehouses transmits instruction data to the control unit for each of the automated warehouses, based on stored inventory data for each of the automated warehouses, storage/retrieval (schedule) data from the control computer, and status data for other apparatus than the automated warehouses transmitted from other integrated control unit, thereby controlling storage/retrieval into and from the automated warehouses, as well as transmitting storage/retrieval data and storage/retrieval status data for each of the automated warehouses by way of LAN to other integrated control units.

However, the constitution of the known storage and materials handling facility involves the following problems.

Since LAN and communication means between the integrated control unit and the control units for each of the apparatuses are present together and since a wide control range is integrally controlled by each of the superintending control units, if abnormality occurs even in one of the integrated control units or LAN, the operation of the entire facility is stopped to lower the operation efficiency.

Further, since the inventory data for the automated warehouse is stored in the integrated control unit for integrally controlling the control unit of the automated warehouse, if in trouble should occur to the integrated control unit, all the inventory data are erased making it impossible for storage/retrieval to interrupt the operation of the entire facility. Further, since operators have to investigate the inventory data for each of the automated warehouses and input the inventory data again, it takes much time for restart the operation, reducing operation efficiency.

Further, if an abnormality should occur, the operators have to complete the restoring operation as rapidly as possible in order not to reduce the operation efficiency, which imposes a large burden on them.

Further, since the integrated control unit has to be designed on every facility and can not be standardized, it may possibly lower the completeness of products and lower the quality.

DISCLOSURE OF THE INVENTION

In view of the above, it is an object of the present invention to overcome the foregoing problems and provide a storage and materials handling facility capable of improving the entire operation efficiency and also improving the reliability.

For attaining the foregoing object, the present invention provides a storage and materials handling facility characterized in that:

communication cables are laid between the storing apparatus and the materials handling apparatus constituting the facility, and control units for each of the storing apparatus and the materials handling apparatus are connected to the communication cables;

the communication cables comprise two communication cables, and the control units for each of the storing apparatus and the materials handling apparatus are connected to the two communication cables by way of branch interfaces; and each of the control units is adapted to transmit a first data by a first communication cable and transmit a second data by a second communication cable among said two communication cables, and each of said branch interfaces has a detection function to detect interruption in each of the communication cables and is adapted such that if interruption is detected in one of the communication cables, said first data and the second data are transmitted by way of the other of the communication cables.

In accordance with the constitution described above, each of the control units is connected by way of the two communication cables and the branch interfaces, the first data is exchanged by the first communication cable while the second data is exchanged by the second communication cable, whereby the data are exchanged at high speed. In addition, if one of the communication cables is put to interference, the first data and the second data can be exchanged by using the other of the communication cables, thereby decreasing the occurrence of data transmission inability and avoiding the operation stopping of the facility.

BRIEF DESCRIPTION OF THE ACCOMPANYING DRAWINGS

DESCRIPTION OF THE PREFERRED EMBODIMENTS

Description is to be made for preferred embodiments according to the present invention with reference to the drawings.

Figure 1:
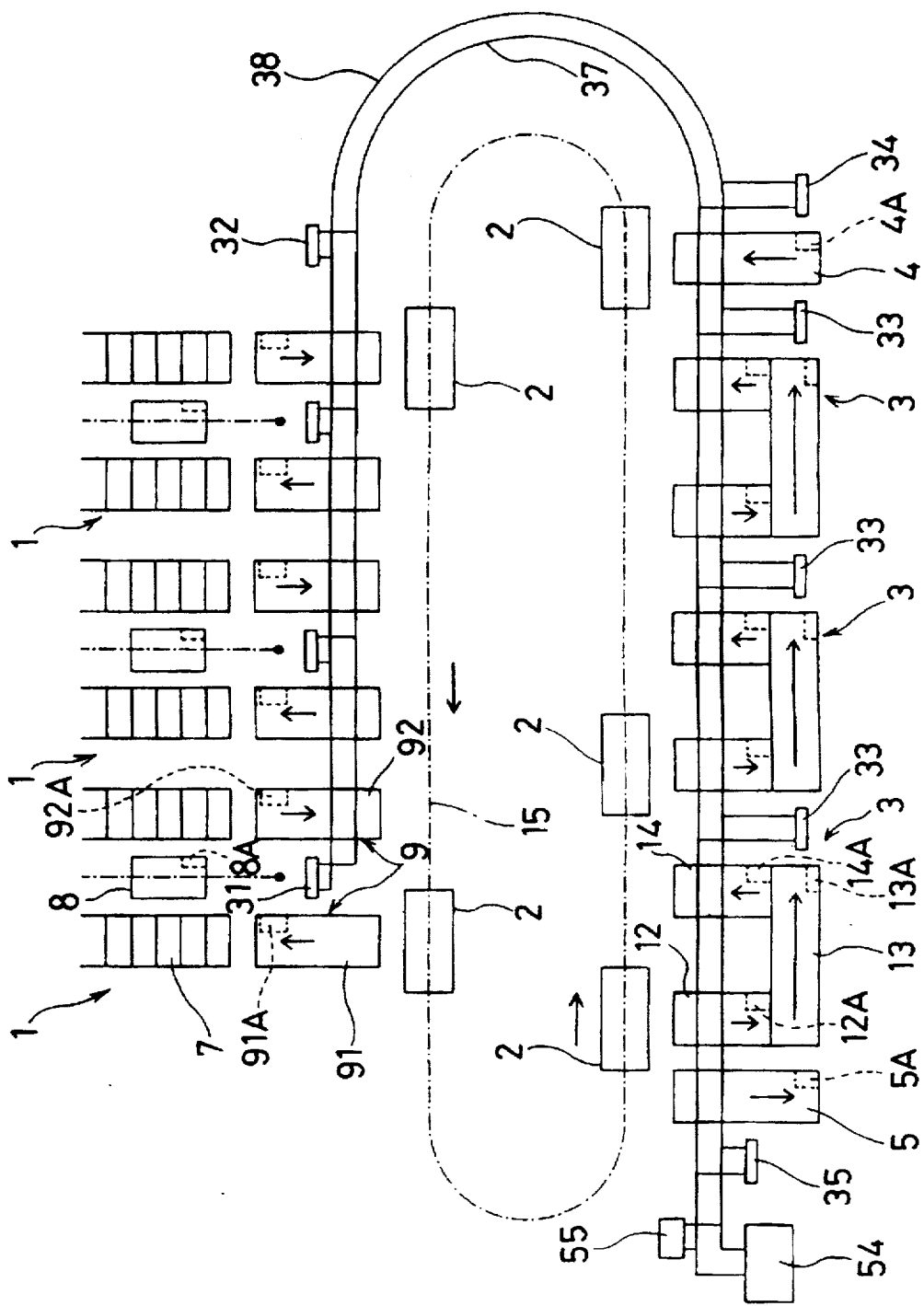
FIG. 1 is a lay-out view illustrating a storage and materials handling facility in a preferred embodiment according to the present invention.

FIG. 1 shows an example for the constitution of a storage and materials handling facility. The facility shown in FIG. 1 comprises a combination of three automated warehouses 1, five self-running conveyor vehicles 2, three picking devices 3, a warehousing conveyor device 4, and a retrieval conveyor device 5.

Each of the automated warehouses 1 comprises a plurality of shelves 7 each provided with a load storing space, a load storing and retrieval device (crane) 8, a pair of load handling conveyors 9, and an integrated control unit 31 for integrated control of the load storing and retrieval device 8 and the load handling conveyor device 9 (hereinafter referred to as RMC) 31. The storing and retrieval device 8 is provided with a control unit 8A. Further, the load handling conveyor device 9 comprises a load carry-in conveyor device 91 and a load carry-out conveyor device 92. Each of the conveyor devices 91 and 92 is provided with control unit 91A, 92A respectively.

Each of the picking devices 3 comprises a carry-in conveyor device 12 for entering a load from the self-running conveyor vehicle 2, a picking conveyor 13 for picking a load transferred from the carry-in conveyor device 12, a carry-out conveyor device 14 for exiting the load transferred from the picking conveyor 13 to the self-running conveyor vehicle 2 and an integrated control unit 33 for integrated control of the conveyor devices 12, 13, 14 (hereinafter simply referred to as PIC). Further, each of the conveyor devices 12, 13, 14 is provides with control unit 12A, 13A, 14A, respectively.

Each of the self-running conveyor vehicles 2 moves along a predetermined path 15 and gives and receives loads to and from each of the conveyor devices 4, 5, 12, 14, 91, 92. Further, an integrated control unit 32 for integrated control of the five self-running control vehicles 2 (hereinafter simply referred to as VTC) is provided.

Further, each of the warehousing conveyor device 4 and the retrieval conveyor device 5 is provided with an integrated control unit 34, 35 for integrated control thereof (hereinafter simply referred to as COS) and each of the conveyor devices 4, 5 is provided with control unit 4a, 5a for driving each of the conveyor devices, respectively.

Further, two communication cables 37, 38 are laid throughout the apparatus. Of the two communication cables, one communication cable 37 has a yellow outer sheath, while the other communication cable 38 has a blue outer sheath for discrimination.

Figure 2:
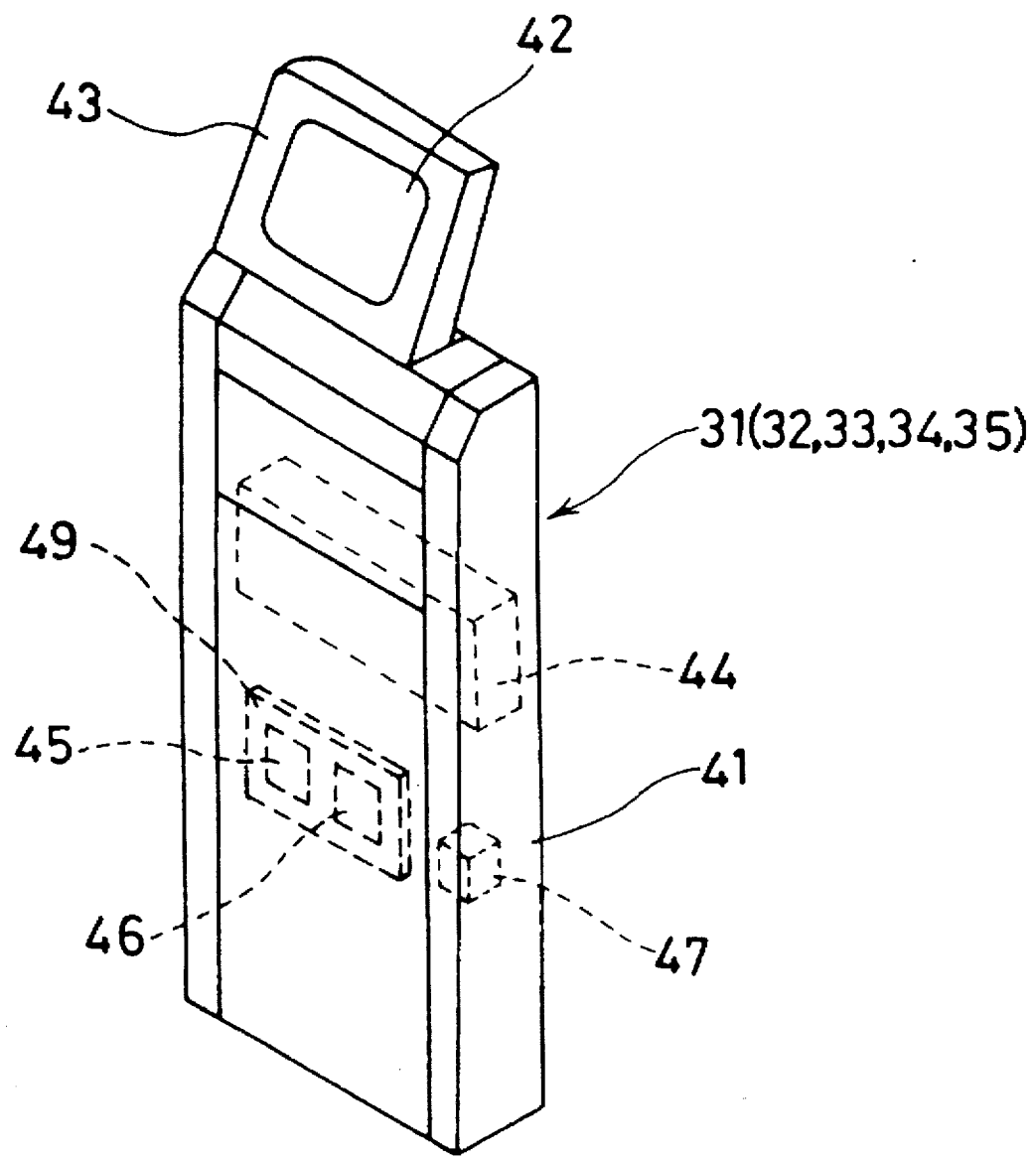
FIG. 2 is a perspective view of a control unit for the storage and materials handling facility.
Figure 3:
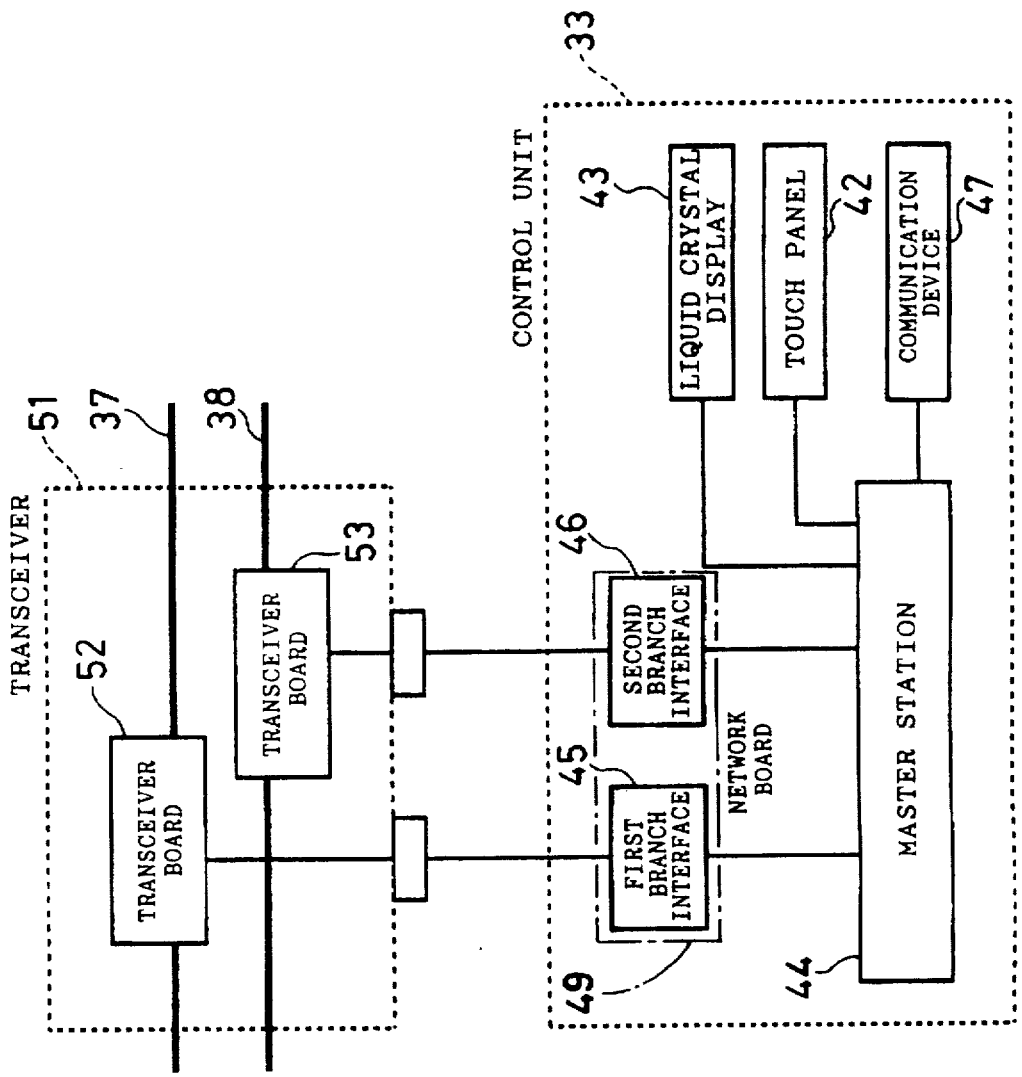
FIG. 3 is a view showing a constitution of the control unit for the storage and materials handling facility and a transceiver.

As shown in FIG. 2, each of the integrated control devices 31–35 has a liquid crystal display 43 disposed on a stand 41 having a touch panel 42, and also has in the stand 41, a controller 44 comprising a microcomputer (hereinafter simply referred to as a master station) 44, a network board 49 comprising a first branch interface 45 and a second branch interface 46 corresponding to each of the communication cables 37, 38, and a communication device 47 to be connected to the control unit for each of the apparatuses. As shown in FIG. 3, the network board 49, the communication device 47, the touch panel 42 and the liquid crystal display 43 are connected to the master station 44, and the master station 44 transmits and receives data by way of the network board 49 and the communication device 47, and inputs a touch position operation signal for the touch panel 42 and outputs an image signal for display on the liquid crystal display 43. In VPC 32, a wireless device (not illustrated) is disposed instead of the communication device 47.

Figure 4:
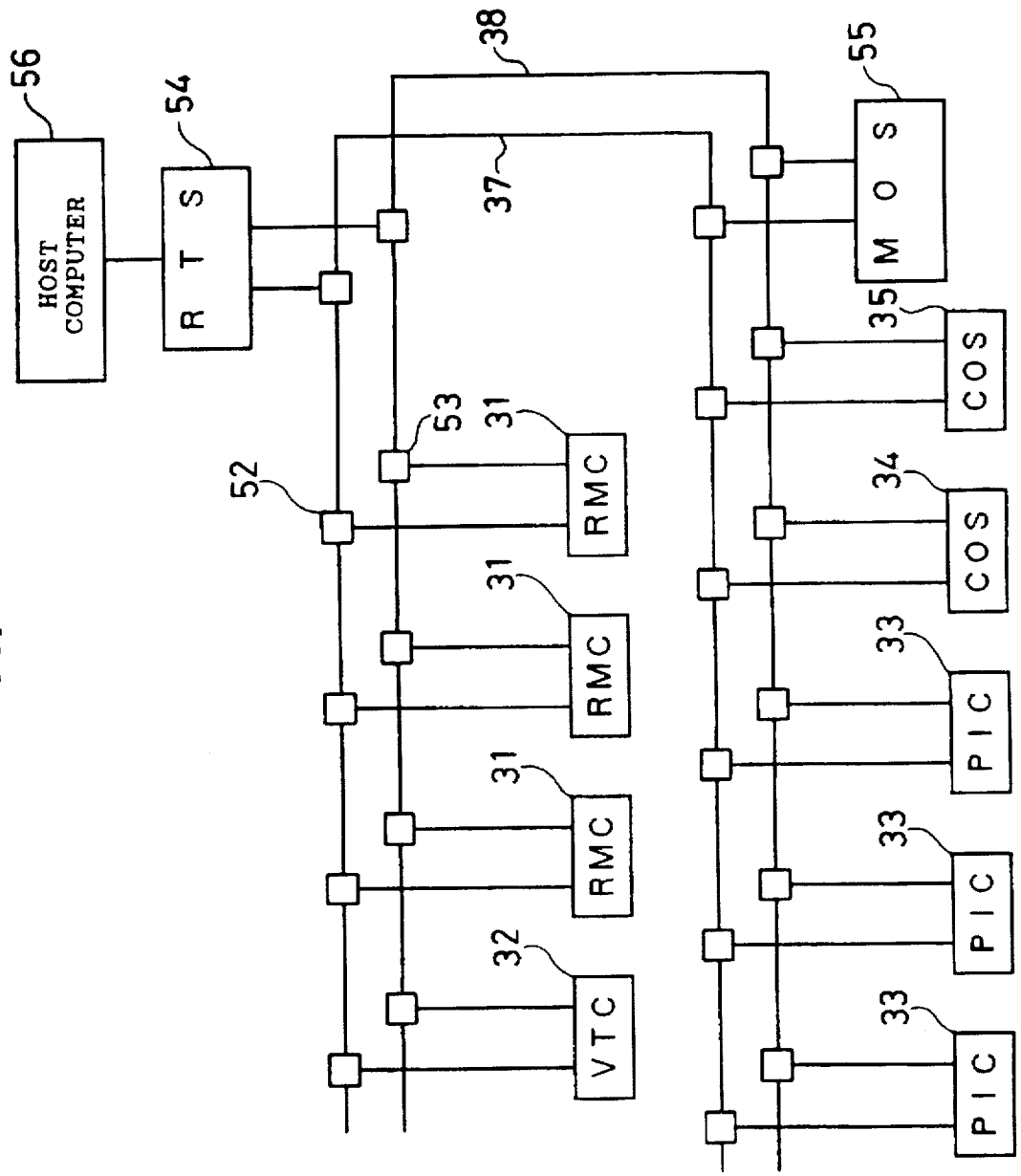
FIG. 4 is a network diagram for the storage and materials handling facility.

A transceiver 51 is disposed to each of the integrated control units 31–35, two transceiver boards 52, 53 are contained in the transceiver 51 and each of the transceiver boards 52, 53 are connected with the branch interfaces 45, 46 of the network board 49 of each of the integrated control units 31–35 and with the communication cables 37, 38 by means of connectors. The network board 49, transceiver boards 52, 53 and the communication cables 37, 38 constitute, as shown in FIG. 4, a buss type LAN basically adopting CSMA/CD system as the buss access system. Further, a facility controller 54 (hereinafter simply referred to as RTS) and a monitor controller 55 are connected in the same manner to the two communication cables 37, 38 by way of each of the transceiver boards 52, 53. The RTS 54 is connected with a host computer 56.

Each of the integrated control units 31–35 transmits and receives predetermined information data by way of the first branch interface 45 and the transceiver board 52, sends and receives predetermined control data by way of the second branch interface 46 and the transceiver board 53, and uses one communication cable 37 as the information data transmission channel, while the other communication cable 38 is used as the control data transmission channel.

Further, each of the branch interfaces 45, 46 of the network board 49 has a function of detecting interruption in each of the communication cables 37, 38 and, if interruption is detected in one of the communication cable 37 or 38, transmits the information data and the control data to the other of normal communication cables 38 or 37 at a retarded transmission rate.

Table 1 shows examples of data that are sent and received by each of the integrated control units 31–35.

The data are transmitted repeatedly from each of the branch interfaces 45, 46 of the network board 49 to the communication cables 37, 38 successively, and predetermined data are transmitted by way of each of the branch interfaces 45, 46 to each of the integrated control units 31–35.

The master station 44 in each of the integrated control units 31–35 outputs a control signal to the control unit for each of the apparatuses based on the inputted data to execute the operation of each of the apparatuses, and inputs a status signal from the control unit of each of the apparatuses and transmits the same to each of the other integrated control units 31–35.

Figure 5:
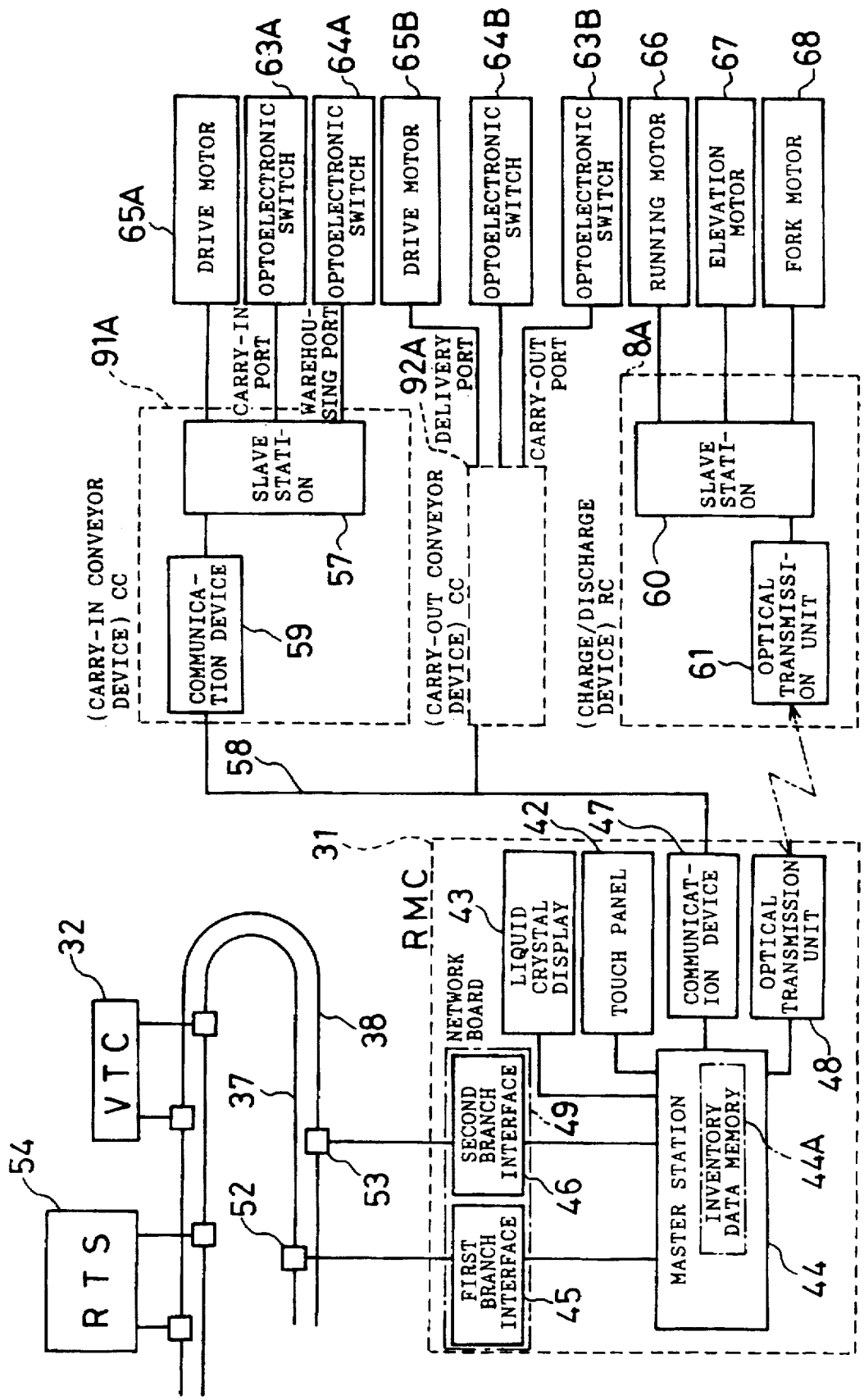
FIG. 5 is a block diagram for illustrating a function for a main portion of the storage and materials handling facility.

As shown in FIG. 5, among each of the integrated control units 31–35, RMC 31 of the automated warehouse 1 is provided with an optical transmission device 48 connected with the master station 44 and, further, the master station 44 is provided with an inventory data memory 44A for storing the inventory data to be described later.

Further, the control unit for each of the apparatuses comprises a communication device for conducting communication with the integrated control unit and a control unit comprising a microcomputer for actually driving a driving means of the apparatus in accordance with the data transmitted from the integrated control unit by the communication device (hereinafter referred to as a slave station). For example, as shown in FIG. 5, each of the control units 91A, 92A for the carry-in and carry-out conveyor devices 91, 92 of the automated warehouse 1 (simply referred to as CC) comprises a slave station 57, and a communication device 59 for conducting communication with the communication device 47 of RMC 31 by way of the communication table 58. Further, the control unit 8A of the storing and retrieval device 8 of the automated warehouse 1 (hereinafter simply referred to as RC) comprises a slave station 60 and an optical transmission device 61 for conducting optical communication with the optical transmission device 48 of RMC 31.

The slave station 57 of CC 91A receives a load detection signal from an optoelectronic switch 63A disposed to the entrance port for receiving loads from the self-running conveyor vehicle 2, and an optoelectronic switch 64A disposed to the warehousing port for transferring loads to the storing and retrieval device 8. Further, the slave station 57 of CC 92A receives load detection signal from an optoelectronic switch 64B disposed to a retrieval port for receiving loads from the storing and retrieval device 8 and an optoelectronic switch 63B disposed to a retrieval port for transporting loads to the self-running conveyor vehicle 2, and outputs a driving signal for driving a driving motor 65B of the conveyor device 92. Further, the slave station 60 of RC8A outputs a driving signal for driving a running motor 66 for the storing and retrieval device 2, an elevation motor 57 for elevating a fork disposed to the storing and retrieval device 8 and a fork motor 68 for driving the fork.

The RTS 54 has a function of controlling data and schedules for loads to be stored or retrieved to and from the facility and outputting the predetermined data in accordance with the schedules, and it comprises, as shown i FIG. 6, a controller 71 (to be detailed later) comprising a microcomputer, CRT 72, a keyboard 73, the network board 49 corresponding to the communication cables 37, 38, and a communication device 77 connected to the host computer 56.

The host computer 56 registers data for the loads to be stored into the facility, the data for the loads to be retrieved from the facility and the schedules for the data by way of the communication device 77 to RTS 54.

RMC 31 and RTS 54 will be described more in details.

Table 2 shows examples of inventory data stored and controlled in an inventory data memory 44A in the master station 44 for each of RMC 31 and inventory data memories 82–84 of RTS 54 (to be described later).

The inventory data comprises data for the presence or absence of a load and an article number code as load-specifying data if the load is present (judging code) on every load storing space in the shelf 7, and the data are updated upon entrance of the load in the automated warehouse 1 and exiting of the load out of the automated warehouse 1.

Figure 7:
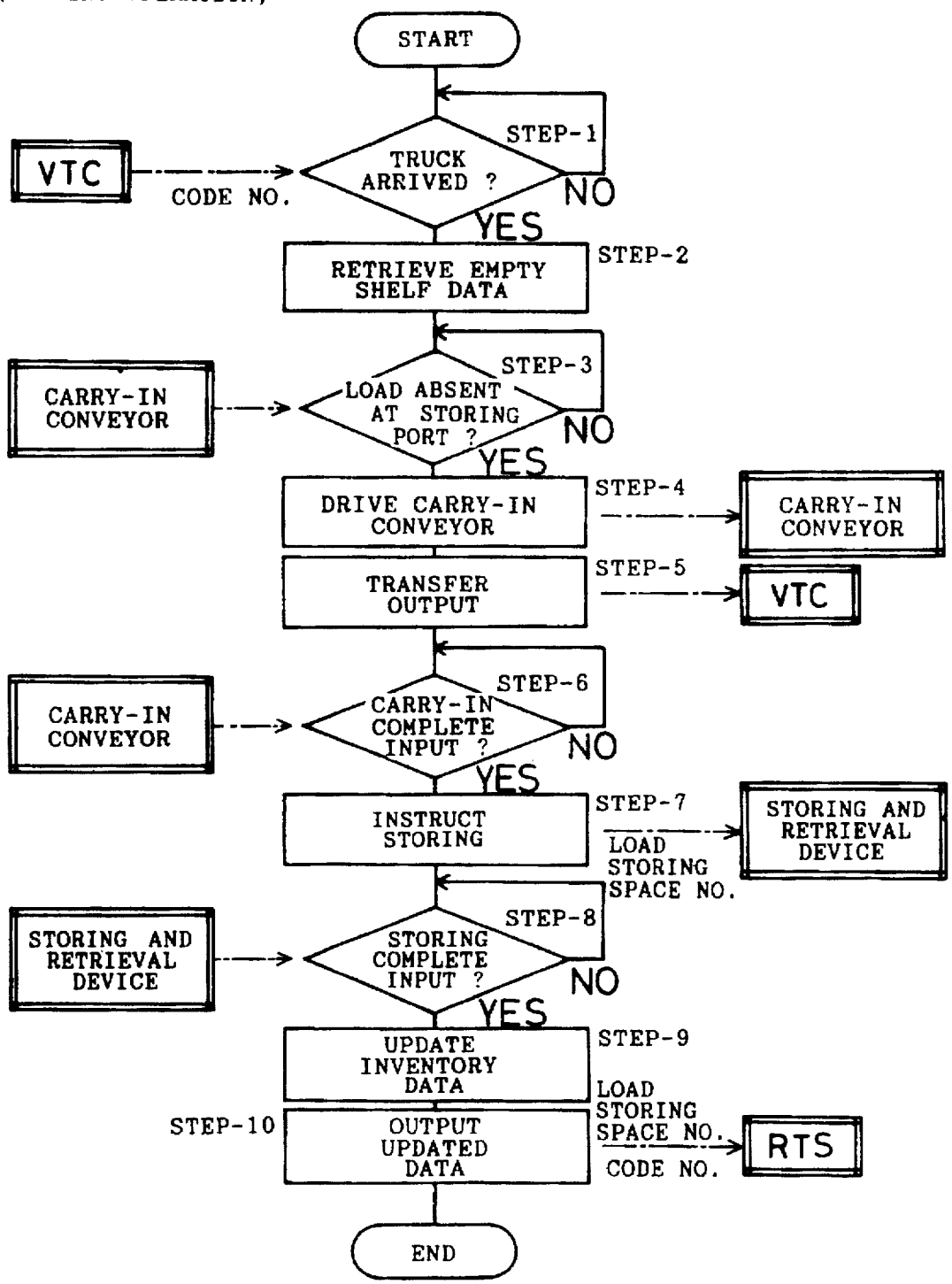
FIG. 7 is a flow chart for explaining the warehousing operation of a control unit for the storage and materials handling facility.
Figure 8:
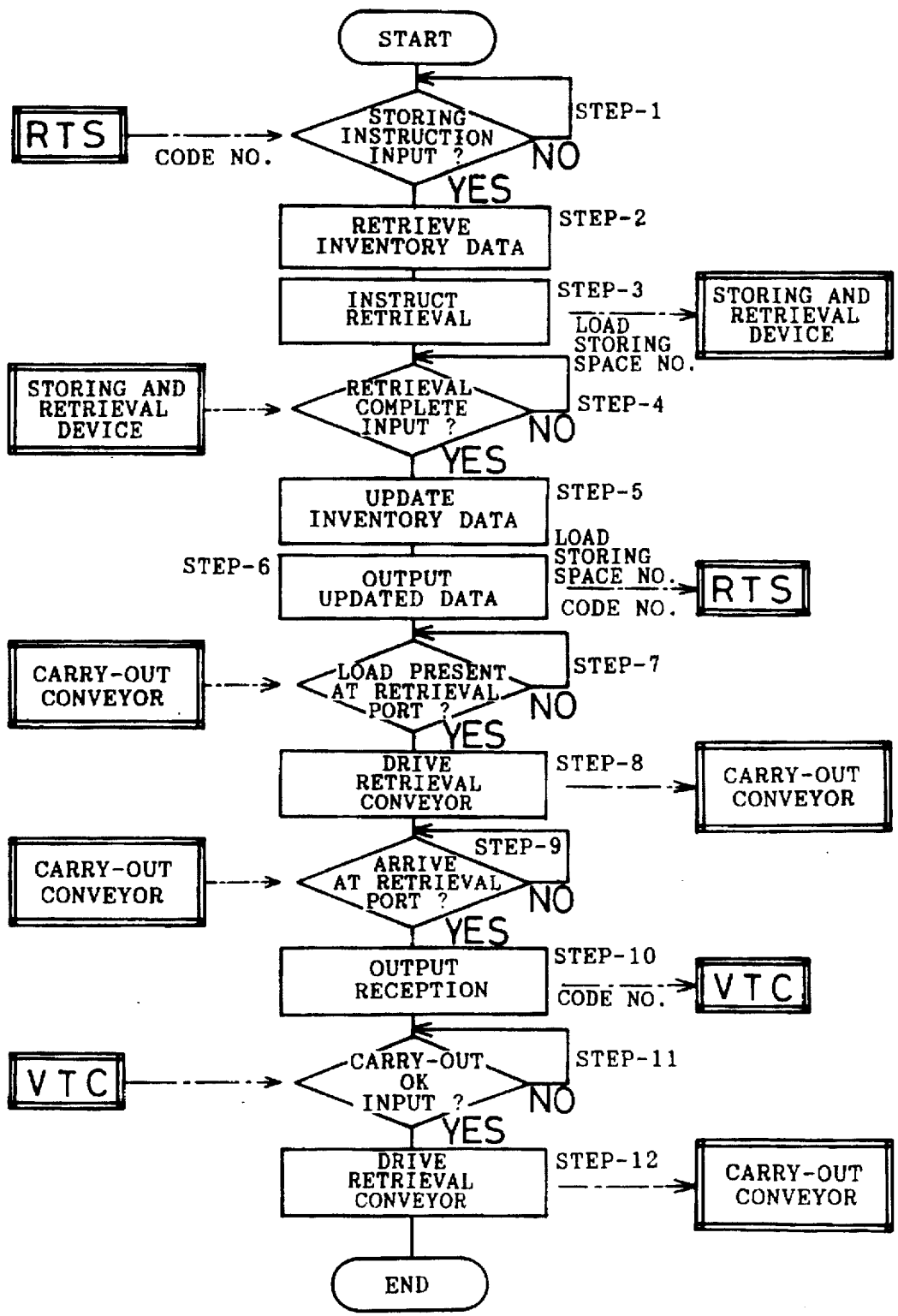
FIG. 8 is a flow chart for explaining the retrieval operation of the control unit for the storage and materials handling facility.

The operation of the master station 44 of RMC 31 is explained in accordance with flow charts shown in FIGS. 7, 8.

(Warehousing Operation) (Refer to FIG. 7)

When arrival of the self-running conveyor vehicle 2 to the position for the carry-in conveyor device 91 of the automated warehouse 1, and control data for the arriving vehicle comprising an article number code for the entered load are inputted from VTC 32 by way of the second branch interface 46, the transceiver board 53 and the communication cable 38 (step-1), a vacant load storing space is retrieved from inventory data (step-2), and when it is confirmed that the load is not present at the warehousing port by the status signal of CC 91A of the carry-in conveyor device 91 by way of the communication device 47 and the communication cable 58 (step-3), a driving signal CC is outputted to 91A of the carry-in conveyor device 91 (step-4), and further a load transfer control data is outputted to VTC 32 by way of the second branch interface 46, the transceiver board 53 and the communication cable 38 (step-5).

The load is transferred by the self-running conveyor vehicle 2 to the carry-in conveyor device 91 and conveyed to the warehousing port by the control data. Then, when a carry-in complete signal is inputted from CC 91A of the carry-in conveyor device 91 to the warehousing port (step-6), a warehousing instruction signal designating the number for the empty load storing space retrieved as described above is outputted to RC8A of the storing and retrieval device 8 by way of the optical transmission device 61 (step-7).

The load is stored in the load storing space designated by the storing and retrieval device 8 in accordance with the output signal. Then, when the warehousing complete signal is inputted from RC 8A of the storing and retrieval device 8 (step-8), the inventory data is updated (step-9). That is, the storing space to which the load is stored is updated to the presence of load, and the article number code of the stored load is stored in the inventory data memory 44A. Then, the updated inventory data is outputted by way of the first branch interface 45, the transceiver board 52 and the communication cable 37 to RTS 54 (step-10), and the operation is completed.

(Retrieval operation) (Refer to FIG. 8)

When retrieval information data comprising an article number code of a load retrieved from the automated warehouse 1 is inputted from RTS 54 by way of the communication cable 37, the transceiver board 52 and the first branch interface 45 (step-1), the load storing space for the article number code is retrieved from the inventory data (step-2), and the warehousing instruction signal comprising the number of the retrieved storing space is outputted to RC8A of the storing and retrieval device 8 by way of the optical transmission device 61 (step-3).

The load in the load storing space designated by the storing and retrieval 8 is retrieved by the output signal to the retrieval port of the carry-out conveyor device 9. Then, when the retrieval complete signal is inputted from RC8A of the storing and retrieval device 8 (step-4), the inventory data is updated (step-5). That is, the storing space from which the load has been retrieved is updated to absence of load and the article number code of the retrieved load is erased. Then, the updated inventory data is outputted by way of the second branch interface 46, the transceiver board 53 and the communication cable 38 to RTS 54 (step-6).

Then, when it is confirmed that the load is present at the retrieval port by the status signal of CC 92A of the carry-out conveyor device 92 by way of the communication device 47 and the communication cable 58 (step-7), a driving signal is outputted to PC 92A of the carry-out conveyor device 92 (step 8).

The load is conveyed by the carry-out conveyor device 92 to the retrieval port by the output signal. Then, when a signal for the arrival of the load to the retrieval port is inputted from CC 92A of the carry-out conveyor device 92 (step-9), control data for the demand of receiving the load is outputted by way of the second branch interface 46, the transceiver board 53 and the communication cable 38 to VTC 32 (step-10).

Then, when the control data for permission of reception is inputted from VTC 32 (step-11), a carry-out signal is outputted to CC 92A of the carry-out conveyor device 92 (step-12) to complete the carry-out operation.

By the constitution and the operation of RMC 31 as described above, loads conveyed successively by the self-running conveyor vehicles 2 are stored into vacant load storing spaces by using the carry-in conveyor device 91 and the storing and retrieval device 8, the inventory data is retrieved based on the retrieval data (load article number code) from RTS 54, and the load is retrieved and transferred to the self-running carry-out vehicle 2 by using the storing and retrieval conveyor device 8 and the retrieval conveyor device 92. Further, upon warehousing and retrieval, the inventory data is updated and stored in the inventory data memory 44A, and the updated data is outputted to RTS 54.

Figure 6:
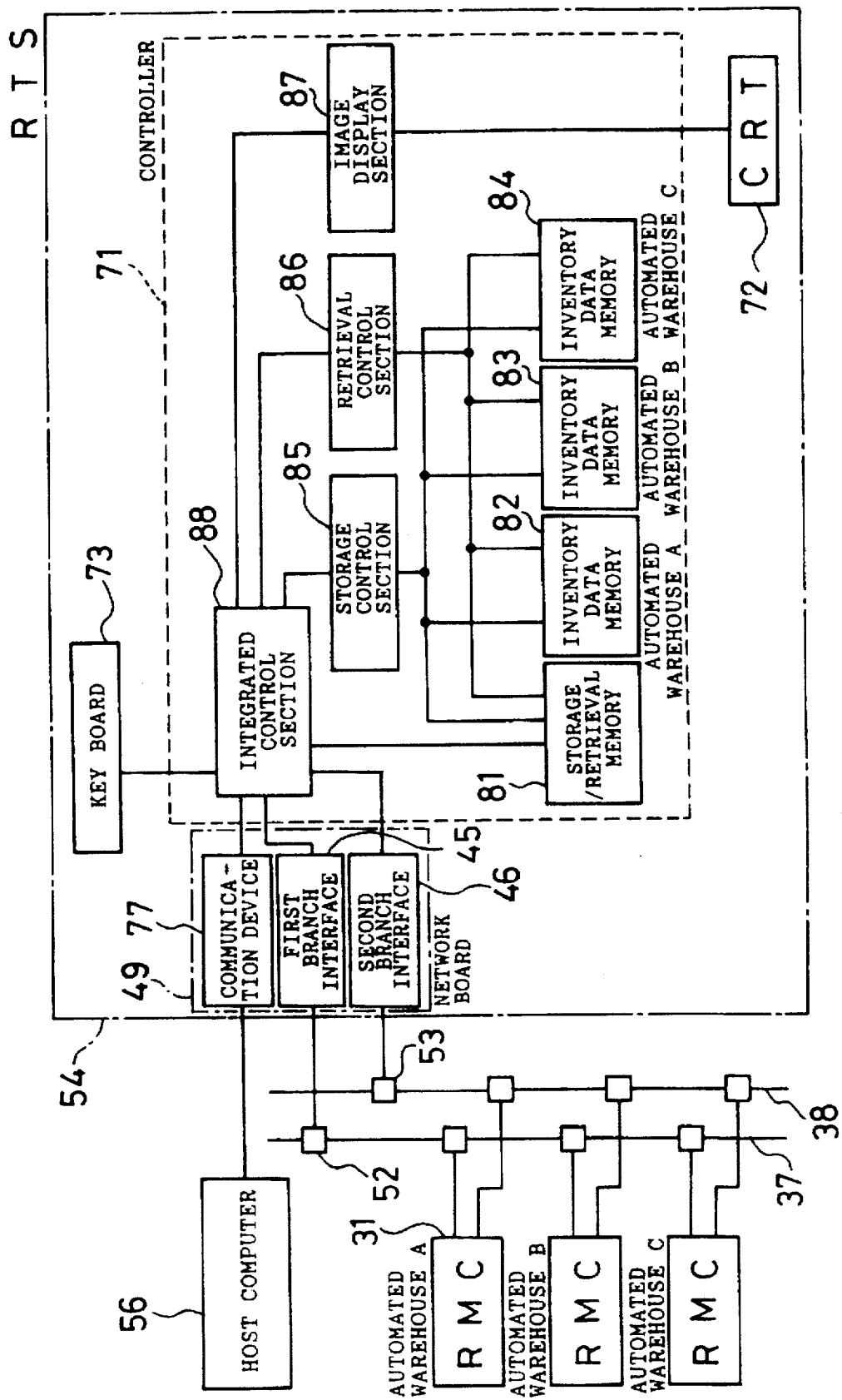
FIG. 6 is a block diagram for illustrating a function for a main portion of the storage and materials handling facility.

FIG. 6 shows a functional block diagram regarding storage/retrieval of the automated warehouse 1 of the controller 71 of RTS 54.

As shown in the figure, RTS comprises storage/retrieval memory 81 for storing data of loads to be ware housed to the facility, data for loads to be retrieved from the facility and schedules for the data, inventory data memories 82, 83, 84 for storing inventory data of each of the automated warehouses respectively, storage control section 85 for controlling the warehousing into the automated warehouse 1 (details to be described later), a retrieval control section 86 for controlling the retrieval from the automated warehouse 1 (details to be described later), an image display section 87 for previously storing data of the screen and forming video signals to be outputted to CRT 72, and an integrated control section 88 connected with the network board 49, the communication device 77 and a key board 73 for integrally controlling the warehousing control section 85, the retrieval control section 86 and the image display section 87. The data for the loads to be stored, data for the loads to be retrieved from the facility and schedules for the data of the loads are stored in the storage/retrieval memory 81 by the integrated control section 88, the data are sent and received between ACM 31 and the warehousing control section 85 and the retrieval control section 86 by way of the network board 49, and the image output demand to CRT 72 is conducted to the image display section 87 in accordance with the operation signal of the key board 73.

Figure 9:
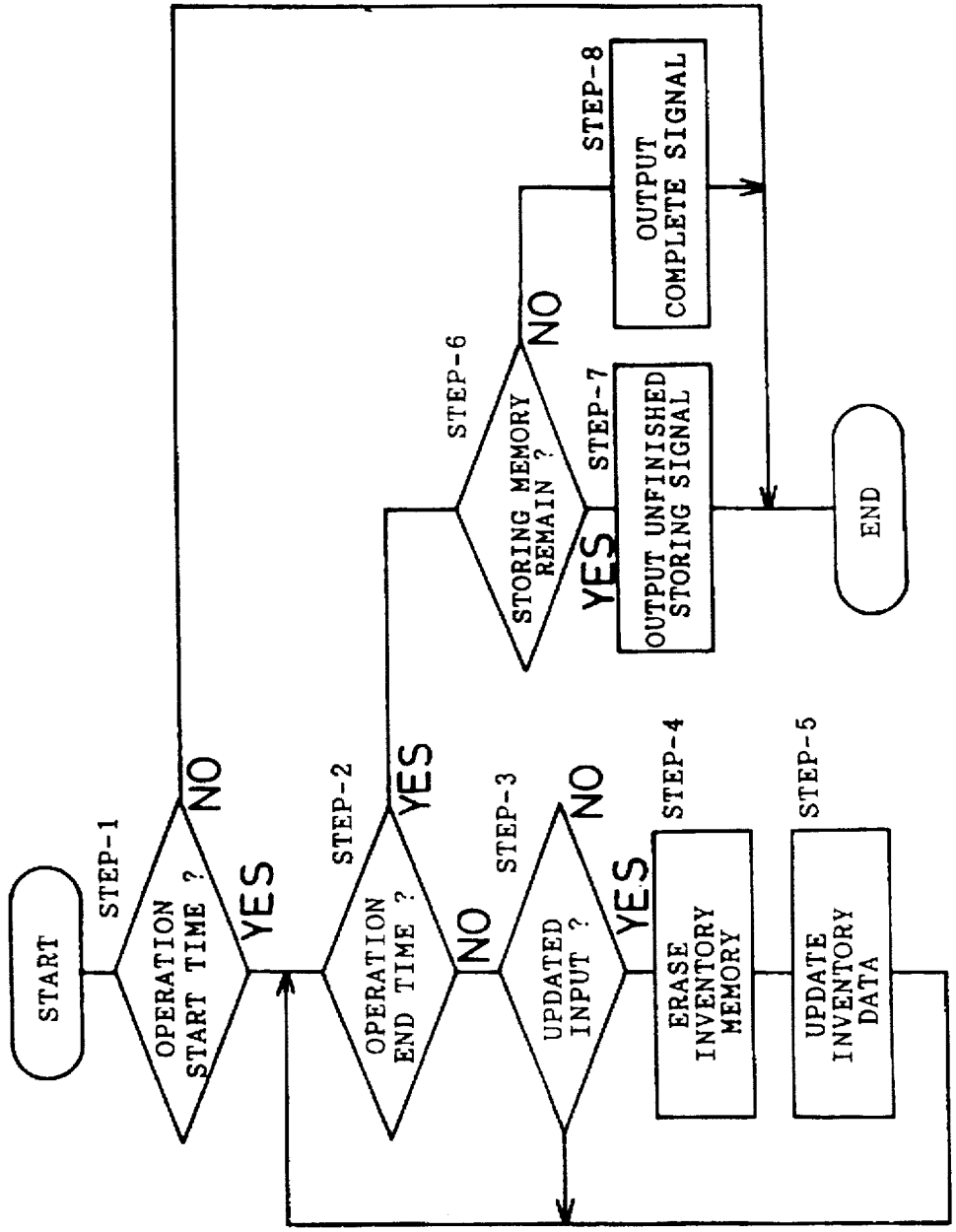
FIG. 9 is a flow chart for explaining the warehousing control operation of a facility controller for the storage and materials handling facility.

The operation of the warehousing control section 85 is explained in accordance with the flow chart shown in FIG. 9.

At first, when it is confirmed that the current time is an operation start time for the facility (step-1), it is confirmed whether the current time is an operation end time for the facility or not (step-2), and if it is before the operation end time (that is during operation time), it is confirmed whether updated data for warehousing is inputted or not from RMC 31 by way of the transceiver board 53, the communication cable 38 and the second interface 46 of the network board 49 (step-3). If the updated data is confirmed, the data for loads to be stored of the storage/retrieval memory 81 corresponding to the updated data is erased (step-4) and the inventory data for the automated warehouse 1 of the updated data is updated (step 5).

At step-2, when the operation end time is confirmed, it is confirmed if the data for the load to be stored, that is, the data is present not being erased in the storage/retrieval memory 81 (step-6). If the data does not remain, a warehousing end signal is outputted by way of the communication device 77 to the host computer 56 (step-7). If the data remains, a not warehousing signal containing the remaining data is outputted to the host computer 56 (step-8) and the operation is ended.

Figure 10:
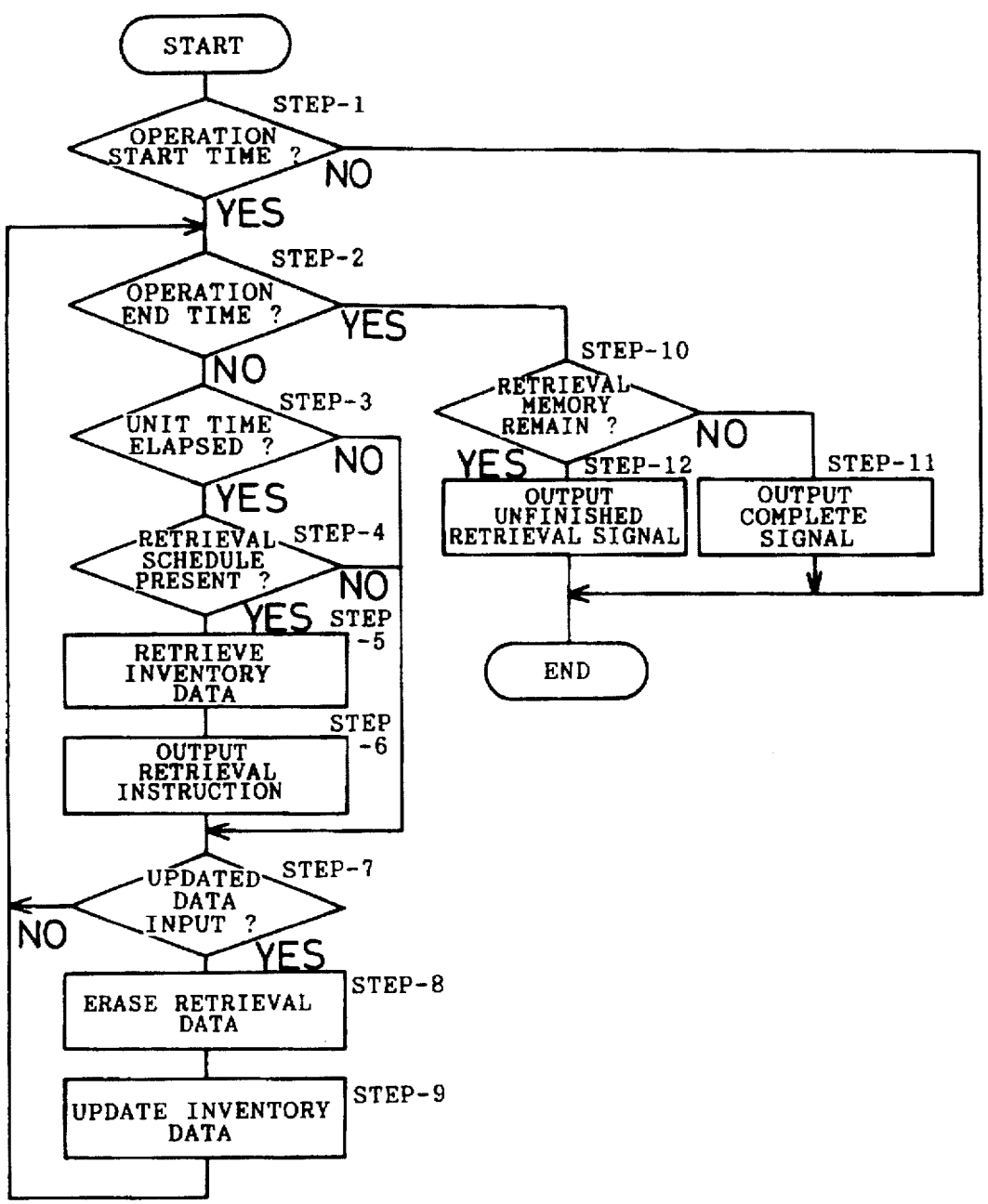
FIG. 10 is a flow chart for explaining the retrieval control operation of the facility controller for the storage and materials handling facility.

Then, the operation of the retrieval control section 86 is explained in accordance with the flow chart shown in FIG. 10.

At first, when it is confirmed that the current time is the operation start time for the facility (step-1), it is confirmed whether the current time is the operation end time for the facility or not (step-2), and if it is before the operation end time, that is, during operation, the schedule for the load to be retrieved in the storage/retrieval memory 81 is confirmed (step-4). When this is confirmed, the inventory data memories 82, 83, 84 are retrieved based on the load data of the schedule (step-5), and the data of the retrieved load is outputted by way of the first branch interface 45 of the network board 49, the transceiver board 52 and the communication cable 37 to RMC 31 of the automated warehouse 1 regarding the confirmed inventory data (step-8).

Then, it is confirmed if the updated data for the retrieval is inputted or not from the RMC 31 by way of the communication cable 38, the transceiver board 53 and the second interface 46 (step-7) and, if the updated data is confirmed, the data of the load to be retrieved of the storage/retrieval memory 81 corresponding to the updated data is erased (step-8), and the inventory data of the automated warehouse 1 for the updated data is updated (step-9).

Further, when the operation end time is confirmed at step-2, it is confirmed if there is any data for the load to be retrieved that remains not being erased in the storage/retrieval memory 81 (step-10). If the data does not remain, a warehousing complete signal is outputted by way of the communication device 77 to the host computer 56 (step-11). If the data is remains, a not retrieval signal containing the remaining data is outputted to the host computer 56 (step-12) to complete the operation.

By the constitution and the function of RTS 54, the retrieval instruction is outputted from the host computer 56 based on the registered data of the load to be stored, the data of the load to be retrieved and the schedule of the data for the loads, the storage/retrieval data are controlled, and the inventory data for each of the automated warehouses 1 is updated and stored based on the updated data inputted from RMC 31. Further after the end of the operation, the storage/retrieval data are confirmed and if the data for loads to be stored or retrieved remains, a not stored or retrieved data is outputted to the host computer 56. If the data does not remain, a complete signal is outputted to the host computer 56.

As described above, since the inventory data for the automated warehouse 1 is controlled in RMC 31 and RTS 54 for each of the automated warehouses 1 respectively, if the inventory data in one of them is erased, it can be backed up rapidly. Further, even during occurrence of a trouble in RTS 54, storage/retrieval can be conducted in the automated warehouse 1. Further, the inventory data updated in this case can be simply transferred to the restored RTS 54 to enable automatic restoration, thereby improving the reliability and the operation efficiency.

Further, since the integrated control units 31–35 are disposed on every apparatus for conducting dispersed control, even if a trouble should occur to one apparatus, operation can be continued by disconnecting the failed apparatus, which enables to avoid stopping of the facility thereby improving the reliability and the operation efficiency.

Further, since control is dispersed, data can be exchanged at high speed for the communication means of increased importance, by providing two LAMs and exchanging information data by one communication cable 37, while exchanging control data by the other communication cable 38. Further, even if one of the communication cables 37 or 38 is interrupted, for example, by disconnection, connector disengagement or contact failure, the information data and the control data can be exchanged by using the other communication cable 38 or 37 thereby to avoid stopping of the facility and improve reliability.

Further, since the information data and the control data are transmitted repeatedly by each of the branch interfaces 45, 46 of the network board 49, it is possible to prevent data leakage or drop out. Further, since operators can restore the interrupted portion leisurely after the completion of storing and materials handling operation, the operator's burden can be moderated.

Further, since the communication cables 37, 38 are identified by different colors, erroneous wiring connection upon wiring operation caused by laying cables over a long distance can be prevented. In addition, since the integrated control units 31-35, and the transceiver 51 can be connected easily by mere connector connection without using tools, the construction term in the field working and the test time can be shortened.

Further, since the integrated control units 31-35 can be manufactured each with an identical constitution, it is not necessary to design the device on every facility, which can be standing and improve the completeness of the products and the quality.

While the inventory data is in the form of the article number code in the foregoing embodiment, the data can be formed also with the article name or like other inherent code.

Further, while the data are transmitted by the communication cables 37, 38 being separated into the information data and the control data, it is not always necessary to separate the data as described above, but they may be optionally separated.

TABLE 1

| Control | Control data | Information data |
|---|---|---|
| RMC | Load handing conveyor device delivery stand-by /Designation/ | Empty shelf information |
| | Load handling conveyor device state | Load data |
| | Srorage/retrieval device state | - |
| VTC | Each vehicle/ Designnation/ | Load data |
| | Empty vehicle information | |
| PIC | Carry-out conveyor device retrieval stand-by/ Designation/ | Load data during picking |
| | Carry-out conveyor device state | Load data |
| COS | Conveyor device retrieval stand-by/ Designation/ | Load data |
| | Conveyor device state | |

TABLE 2

| Load storing space No. | Vacant:0 Present:1 | Judging code |
|---|---|---|
| 1 | 0 | |
| 2 | 1 | TG1102 |
| 3 | 1 | HH2209 |
| N-1 | 0 | |
| N | 1 | KM5146 |

What is claimed is:

1. A storage and materials handling facility comprising in combination storing apparatuses such as automated warehouses and materials handling apparatuses such as load conveying vehicles and conveyor devices, characterized by:

a first communication cable and a second communication cable laid between the storing apparatuses and the materials handling apparatuses;

a first communication device and a second communication device both provided in control units of the storing apparatuses and the materials handling apparatuses;

a first branch interface for connecting the first communication cable to the first communication device and a second branch interface for connecting the second communication cable to the second communication device;

said first communication device in each of the control units being adapted to transmit first data through the first branch interface and the first communication cable, and said second communication device being adapted to transmit second data through the second branch interface and the second communication cable;

each of said branch interfaces being adapted to repeatedly transmit data inputted from each of the communication devices through each of the communication cables;

each of said branch interfaces having a detecting function to detect interruption in each of the communication cables such that if interruption is detected in one of the communication cables, both the first and second data are transmitted through the other of the communication cables.

2. A storage and materials handling facility as defined in claim 1, wherein the two communication cables are colored differently.

3. A storage and materials handling facility comprising in combination storing apparatuses such as automated warehouses and materials handling apparatuses such as load conveying vehicles and conveyor devices, characterized by:

communication cables for connecting between control units of the storing apparatuses and the materials handling apparatuses;

a facility controller connected to the communication cables and outputting previously registered storage/ retrieval data in accordance with a schedule;

said control units of the automated warehouses being adapted to drive, through the communication cables, a storing and retrieval apparatus in accordance with the storage/retrieval data inputted by the facility controller to control data for specifying loads at each of load storing spaces of shelves and to output this data to the facility controller through the communication cables;

said facility controller having a function to control inventory of all the automated warehouses according to the data for specifying loads at each of the load storing spaces of the shelves inputted from the control units of each of the automated warehouses through the communication cables;

said control units of the automated warehouses and said facility controller having a function to interactively back up, through the communication cables, the data for specifying loads at each of the load storing spaces of the shelves in the automated warehouses.

* * * * *